(No Model.)
J. STEMMONS.
Shield for Cattle.
No. 243,644.
Patented June 28, 1881.
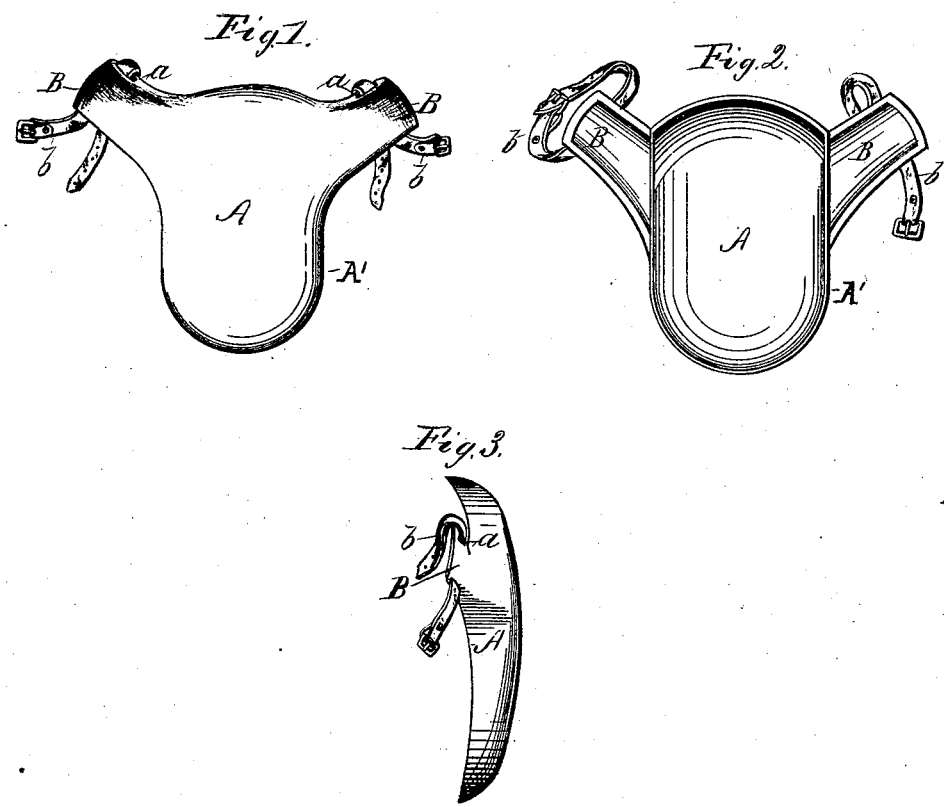

UNITED STATES PATENT OFFICE.

JOHN STEMMONS, OF EUREKA, CALIFORNIA.

SHIELD FOR CATTLE.

SPECIFICATION forming part of Letters Patent No. 243,644, dated June 28, 1881.

Application filed February 24, 1881. (No model.)

*To all whom it may concern:*

Be it known that I, JOHN STEMMONS, a citizen of the United States, residing at Eureka, in the county of Humboldt and State of California, have invented certain new and useful Improvements in Shields or Bumpers for Horned Cattle; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in shields or bumpers for horned cattle, especially sheep, and it is designed to prevent them from being injured by fighting, which occasions the loss of very many of the most valuable animals, the blooded animals, especially sheep, being almost invariably nervous and irritable.

In the drawings, Figure 1 is a front view of my improvement. Fig. 2 is a similar view of the reverse side thereof, and Fig. 3 is a side elevation.

A represents a shield or bumper, which is made of rubber or any other suitable material, to form a pad or cushion, and it is provided with the apertures $a\,a$ in the wings B B, through which are inserted the straps $b\,b$ for securing the shield to the horns. When made of leather or hide it is cut out and sewed to form the shape herein shown, and is then padded, as aforesaid, to form a soft cushion.

It will be observed that the structure of the shield is such that the elastic substance contained therein is securely held in place by the formation of the pouch A', which projects horizontally from the head of the animal to such extent as to prevent its horns from being brought into contact with its opponent when fighting, thus saving the lives of many animals. Into this pouch is inserted any suitable elastic material or such elastic material as may readily be procured by farmers or graziers in any part of the country. The pouch is manufactured and supplied by sale to farmers and graziers.

The pouch A' may be made of rubber, gutta-percha, or other suitable material, and formed into a single piece.

Having thus described my invention, what I desire to secure by Letters Patent, is—

As an improved manufacture, the shield A, having the pouch A', adapted to be filled with suitable material, and provided with straps whereby it may be attached to the head of an animal, all substantially as shown and described.

In testimony whereof I affix my signature in presence of two witnesses.

JOHN STEMMONS.

Witnesses:
M. H. BALDWIN,
A. W. RANDALL.